Dec. 8, 1931. C. S. BRAGG ET AL 1,835,751
BRAKE ACTUATING MECHANISM FOR AUTOMOTIVE VEHICLES
Filed July 10, 1926 3 Sheets-Sheet 3
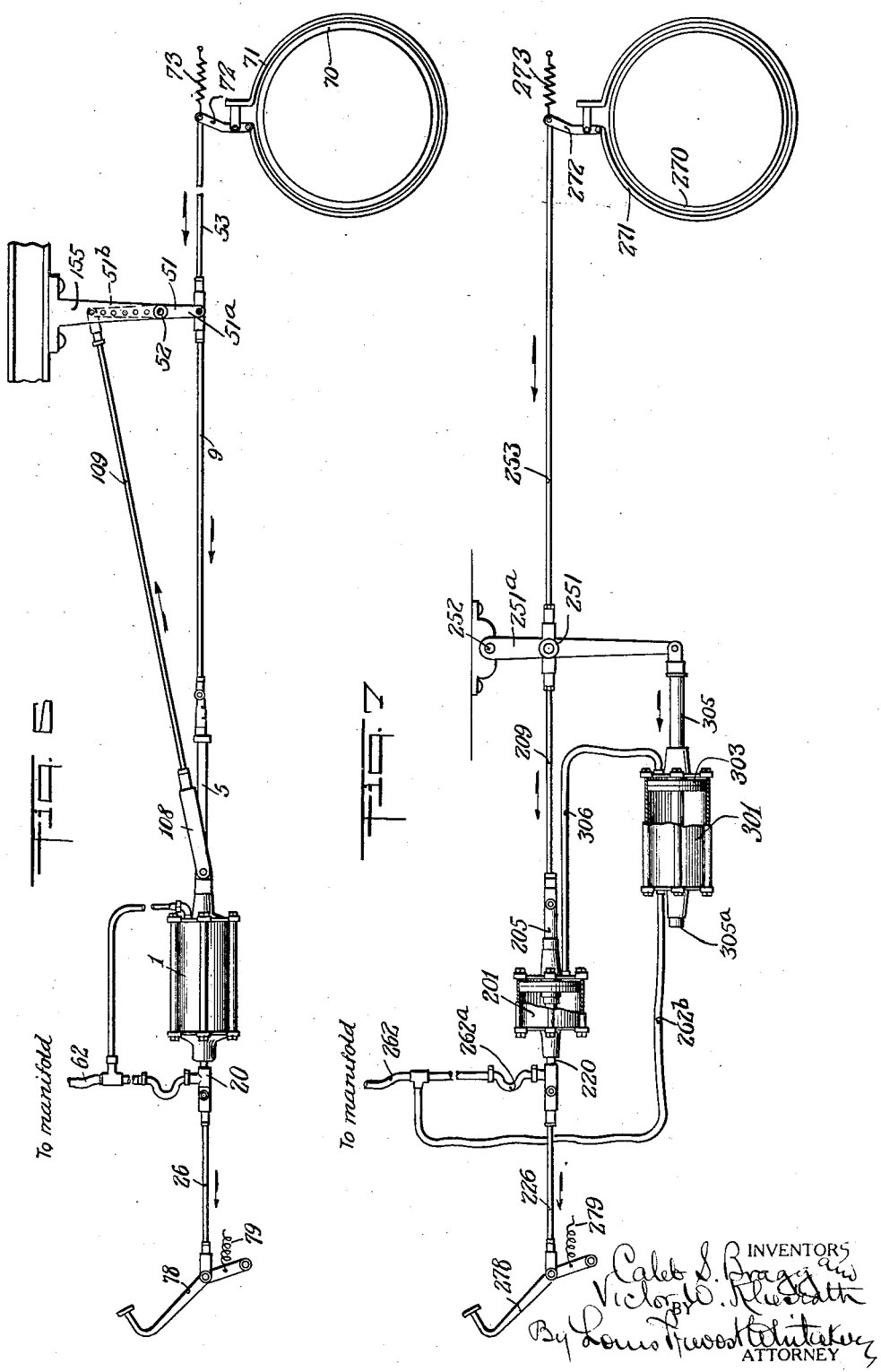

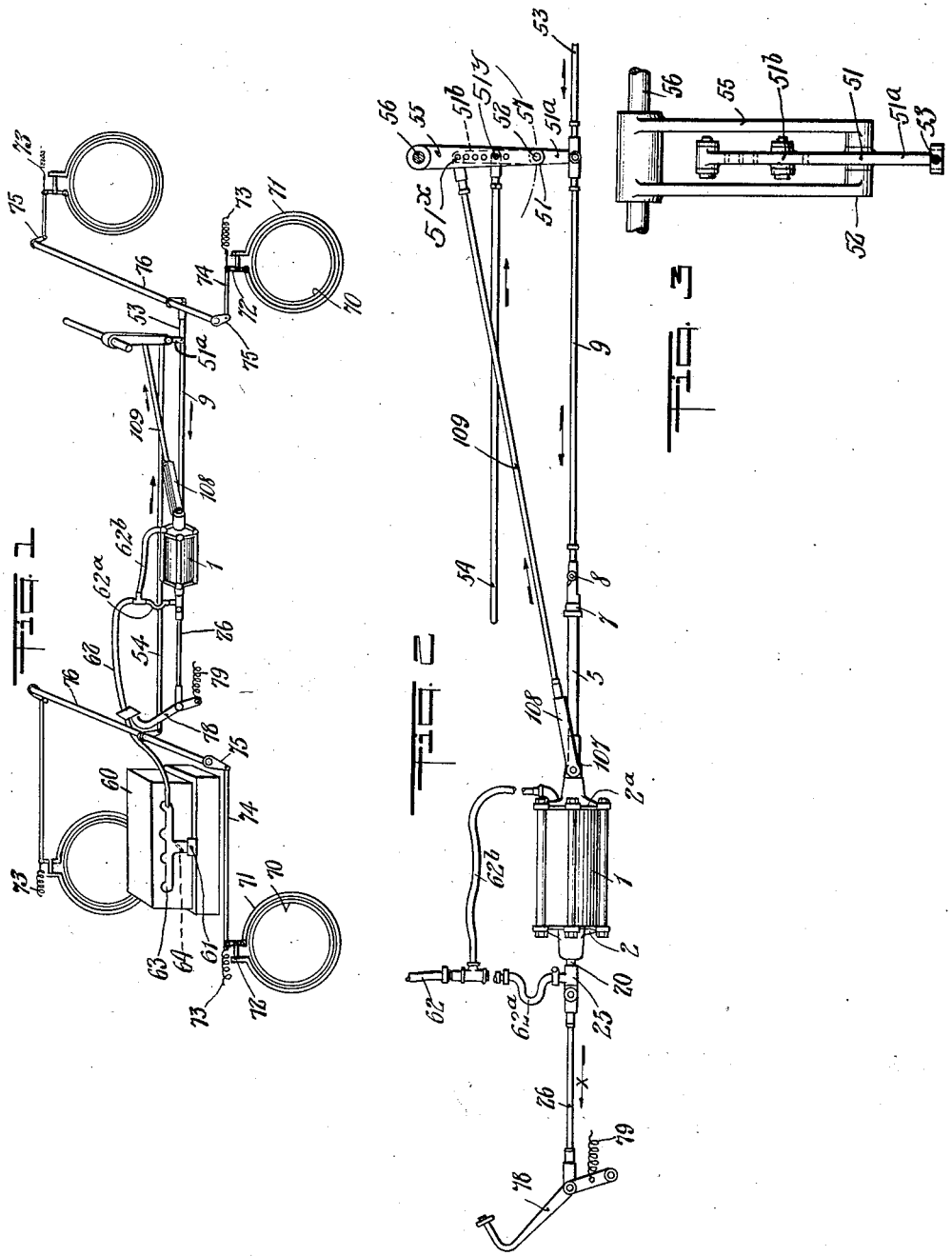

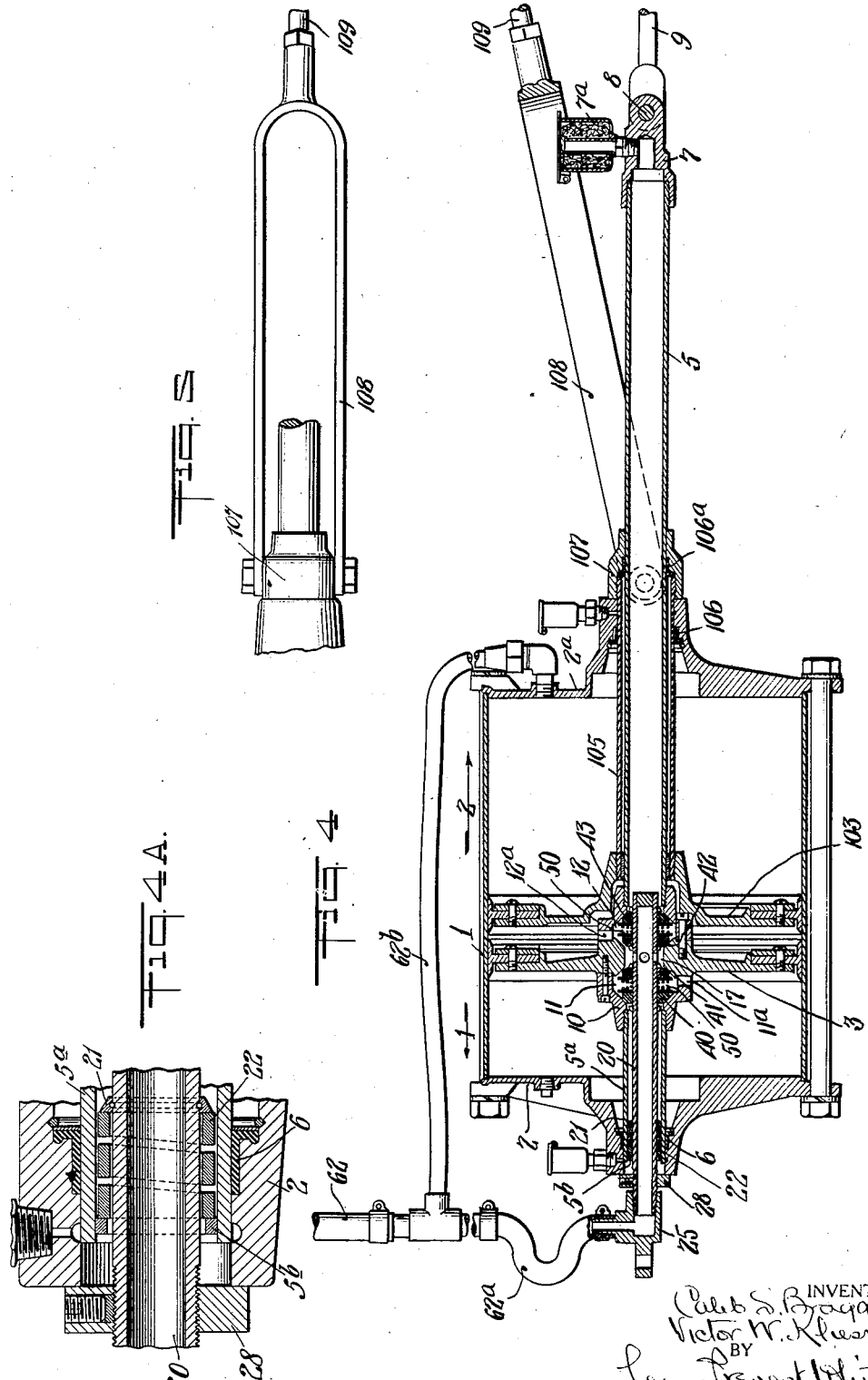

Patented Dec. 8, 1931

1,835,751

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE ACTUATING MECHANISM FOR AUTOMOTIVE VEHICLES

Application filed July 10, 1926. Serial No. 121,545.

Our invention consists in the novel features hereinafter described, reference being had to the accompanying drawings, which illustrate several embodiments of the same, selected by us for purposes of illustration, and the said invention is fully disclosed in the following description and claims.

Our invention relates to suction actuated brake mechanism for automotive vehicles, operated preferably by a suction connection from the intake manifold of the internal combustion engine which propels the vehicle. In apparatus of this type, atmospheric air is usually relied upon for the higher pressure fluid and the result is that the differential pressures, amounting approximately to ten pounds per square inch, is the extent of the available power. To obtain increased power, it would be obviously necessary to increase either the bore of the cylinder, or the stroke of the piston, or both. As a matter of fact, there is a well defined limit beyond which the bore of the actuator cylinders may not be increased on account of the fact that they would, if made too large, project too far below the frame of the vehicle, and would not provide sufficient road clearance. This is especially true on the newer types of lower hung busses, trucks and automobiles. It is therefore necessary to increase the stroke of the piston by the proper arrangement of leverages to obtain increased power in the actuator, where desired. On the other hand, an increase in the stroke of the piston of a vacuum brake operating power actuator connected by proper leverages to the brake mechanism, would, if a single acting piston were employed, make the return of the piston to normal position under the action of the customary retracting springs, unduly slow on account of the interference of the power multiplying leverages. It is therefore desirable that a piston of increased stroke should be double acting, in which case more air would have to be exhausted into the manifold than would be the case if a single acting piston were used, with greater likelihood of interfering with the operation of the engine, or stalling it, if idling.

Our present invention has for its object a construction in which an increased power stroke is obtained from a double acting actuator without increasing the bore of the cylinder, and without admitting proportionately greater quantities of air into the actuator, and consequently into the intake manifold. In carrying out our present invention, we employ, in conjunction with a double acting piston having a relatively short stroke, a single acting piston having a considerably longer stroke, the said pistons being located either in the same cylinder, or in separate cylinders, and operatively connected with the same brake mechanism. By means of the considerable leverages whereby both pistons may apply power to the same brake mechanisms, and apply the brakes with one, two or more pairs of wheels of which the vehicle may be provided, by either a pulling or pushing action, as preferred, the said connections between the brake mechanisms and the said pistons permitting the single acting piston having the longer stroke to be positively returned to its retracted position by the return stroke of the double acting piston, and avoiding the necessity of admitting sufficient quantity of air to return the long stroke piston by direct action thereon, which would have to be consequently withdrawn and delivered into the intake manifold. In carrying our invention into effect, we also maintain the pistons submerged in vacuum when in retracted or off position, so that when the pistons are actuated to produce a power stroke, practically no air is delivered to the intake manifold, the only air passing to the intake manifold being delivered thereto during the return stroke of the pistons, and after they have been restored to retracted position. Our invention also contemplates the use in connection with a connecting and power amplifying lever construction interposed between the two pistons, of a pivotally mounted hanger or support therefor, permitting the fulcrum of the connecting and power amplifying lever to be shifted slightly to equalize the application of power between a plurality of brake mechanisms, as for example, where the pistons are operatively connected for operating both front and rear wheel brakes.

We also prefer to provide the double acting piston having the shorter stroke, with reversing valve mechanism connected with an operator operated device or foot pedal, which is also connected with the double acting piston by means permitting a sufficient amount of lost motion to operate the valve mechanism, so that the operator may apply his physical strength to the double acting piston, and therethrough to the brake mechanism, either in addition to the power of the actuator, or in case of failure of power. This construction has the further advantage that the valve mechanism is more directly and readily operated, and the foot pedal has a more natural "feel" than would be the case if the valve mechanism were located in a piston having a greater travel than the foot pedal, and connected thereto by connections including reducing leverage.

In the preferred form of our invention, in which both pistons are located in the same cylinder, the power stroke of both pistons is effected by admitting atmospheric air between the pistons and the return stroke of both pistons is effected by withdrawing the air previously admitted and admitting additional quantities of atmospheric air between the forward end of the cylinder and the double acting piston only, which assists the retracting springs of the brake mechanism to effect a quick release of the brakes with a minimum of air admitted to the apparatus, and subsequently discharged into the intake manifold when the pistons reach their retracted or off positions. The end of the cylinder containing the single acting piston in our preferred construction is always connected with the source of vacuum.

In the accompanying drawings, which illustrate several embodiments of the invention, selected by us for purposes of illustration:

Fig. 1 is a diagrammatic view representing an installation in an automotive vehicle embodying our invention, the actuator cylinder being provided with a double acting piston having a short stroke and a single acting piston having a longer stroke, operatively connected with each other and with the brake mechanism for the front and rear pairs of wheels.

Fig. 2 is an enlarged detail showing the actuator and its connections.

Fig. 3 is an enlarged detail view of an equalizing hanger or pivoted support which we prefer to employ where more than one set of brakes are to be simultaneously actuated.

Fig. 4 is an enlarged sectional view of the actuator shown in Figs. 1 and 2.

Fig. 4a is an enlarged section of a detail of Fig. 4.

Fig. 5 is a detail of a yoke, which is conveniently employed for connecting the single acting piston with the connecting and power amplifying lever.

Fig. 6 is a view similar to Fig. 2, showing the connecting and power amplifying lever supported on a fixed pivotal support, as where a single set of brake mechanism is used.

Fig. 7 is a view similar to Fig. 6, showing the double acting piston and the single acting piston located in separate cylinders.

Referring to the diagrammatic representation of the installation in Fig. 1, 60, represents the internal combustion engine for operating the vehicle, provided with the usual carburetor, 61, intake manifolds, 63, and throttle valve, 64, the intake manifold providing the suction for the power actuator by means of a suction pipe, 62. In this instance the vehicle is shown as provided with four wheel brakes, each of which is conventionally illustrated, it being understood that brake mechanism of any desired character may be employed. In this instance we have shown our brake mechanism comprising a drum, 70, friction band, 71, brake lever, 72, and retracting spring, 73, the brake levers, 72, being connected by links, 74, with arms, 75, on rock shafts 76. In the form of our invention illustrated in Figs. 1 to 5, inclusive, the actuator comprises a cylinder, 1, provided with heads, 2 and 2a, and having therein a double acting piston, indicated at 3, and a single acting piston, indicated at 103, and arranged to have a greater stroke than the double acting piston. The difference in the strokes of the two pistons may be whatever is desired. In the present instance the single action piston, 103, has a stroke practically double that of the double acting piston, 3. The single acting piston, 103, is provided with a hollow piston rod, 105, extending through a stuffing box, indicated at 106, in the cylinder head, 2a, as shown, and the outer end of the piston rod, 105, is provided with means for attaching it to the part to be operated, consisting in this instance of a threaded sleeve, 107, which is pivotally connected to a yoke, 108, to which is secured a link rod, 109. The piston, 3, is provided with a hollow piston rod, 5, which extends through the hub of the piston, 103, and through the hollow piston rod, 105, and through a stuffing box, indicated at 106a, in the sleeve, 107, and is provided at its outer end with a terminal fitting, indicated at 7, provided with a perforated lug, or lugs, 8, by means of which it is connected to a link rod, 9. Means are provided for admitting air to the interior of the hollow piston rod, 5, and this may be accomplished by means of an aperture in the fitting, 7, which may be provided with a strainer cup, 7a, as indicated, which will insure the admission of air free from dirt, grit, etc., which might injure the valve mechanism. The cup, 7a, may be filled with fibrous material, or may be of any preferred construction, which will act as a strainer for the air. The main, or double, acting piston, 3, is also preferably provided with another hollow piston rod, 5ª, extending through a stuffing box, 6, in the hub of cylinder head, 2, as shown, this piston rod being also constructed to admit atmospheric air to the interior of the piston hub, in which the reversing valve mechanism of the actuator is located, and the piston rod, 5, assists in guiding the main piston in its movements. Within the hub of the main piston 3, is located the reversing valve mechanism, and we prefer to employ valve mechanism of the general type illustrated in our prior applications for Letters Patent of the United States filed November 22, 1924, Serial No. 751,481; January 31, 1925, Serial No. 5,947 and October 2, 1925, Serial No. 60,018. The hub, 10, of the piston, 3, is provided with two valve chambers, 11 and 12, in each of which are located a pair of oppositely disposed valves, indicated at 40, 41, 42 and 43. The valve chamber, 11, communicates by port or ports 11ª, with the cylinder forward of the piston, 3, and the valve chamber, 12, communicates by port or ports, 12ª, with the space between the two pistons, 3 and 103. Suitable retracting means, indicated at 50, are provided between the valves of each pair for pressing them normally in opposite directions toward their respective seats. These valves are carried upon the longitudinally movable valve sleeve, indicated at 20, and means are provided for sealing the openings in the valves through which the sleeve, 20, passes, which is conveniently accomplished by forming the valves out of molded rubber and providing them with central apertures which fit the sleeve, 20, so as to form an air tight contact therewith, while permitting the longitudinal movement of the sleeve, 20, through the valve. The valve sleeve, 20, is also provided with suitable collars on opposite sides of the pairs of valves, so that when the sleeve is moved in either direction it will open one valve of each pair, and thereby compress the intervening cushion, 50, and increase its pressures on the other valve of the pair to hold it seated. Between the seats for the valves, 41 and 42, the hub of the piston is provided with a suction chamber, 17, which communicates with the suction pipe, 62, from the intake manifold of the engine, in this instance through the interior of the hollow sleeve, 20, and a flexible pipe section, 62ª, connected to a fitting, 25, at the outer end of the sleeve, 20, suitable apertures being provided in the sleeve to effect the communication between it and the suction chamber, 17. The sleeve, 20, is preferably provided with a stop collar, 28, adjustably secured thereto and adapted to engage the end of the head, 2, when the parts are in the normal or retracted position, and to hold the valves, 41 and 42, which we term the suction valves, both in slightly open position, as indicated in Fig. 4, thereby establishing communication between the suction pipe, 62, and the cylinder, 1, on both sides of the main piston, 3. We also connect the rear end of the cylinder, 1, with the suction pipe, 62, as by means of a pipe, 62ᵇ, so that when the engine is in operation, the air will be exhausted from the entire cylinder on both sides of the piston, and betwen the pistons 3 and 103, so that the pistons are both submerged in vacuum. The particular valve mechanism by which this is accomplished forms no part of our present invention, and is not specifically claimed herein.

For the purpose of operating and controlling the valve mechanism, the sleeve, 20, is operatively connected, as by a link, 26, with a pivotal pedal lever, 78, or other operator operated part, which is preferably provided with the usual retracting spring, 79. It will be obvious that the parts of the actuator being in the position indicated in Fig. 4, if the foot lever is depressed so as to move the sleeve, 20, in the direction of the arrow, X, Figs. 2 and 4, the valve, 42, will be closed, the valve, 41, will be further opened, continuing the connection between the suction chamber and the cylinder forward of the main piston, 3, while the valve, 43, will be opened, admitting atmospheric air to the space between the two cylinders through the port, or ports, 12ª. This effects a working stroke or power stroke, the double acting piston, 3, moving in the direction indicated at the arrow, 1, in Fig. 4, and the single acting piston, 103, moving in the direction of the arrow, 2, and having a stroke substantially twice the length of the stroke of the piston, 3. In order to simultaneously apply the power of these two pistons of different length stroke, we preferably employ a connecting and power multiplying lever, one form of which is indicated at 51, pivoted at 52, and providing two arms, or sections of different length, proportionate to the difference of the lengths of the strokes of said pistons. In the present instance we have shown, in Figs. 1 and 2, for example, the lever, 51, provided with a short arm, 51ᵉ, connected with the link rod, 9, from the main or double acting piston, 3, and having an arm, 51ᵇ, of substantially twice the length of the arm, 51ª, to which the link, 109, extending from the piston rod, 105, of the single acting piston, 103, is connected. In the present instance we have shown the link, 51ª, connected with the rock shaft, 76, of the rear wheel brake mechanisms, by a link rod, 53, and we have shown the arm, 51ᵇ, connected at a distance from the point of pivoting, 52, substantially equal to the length of the arm, 51ª, by a link rod, 54, with the rock shaft, 76, of the front wheel brakes, so that the power of both pistons will be applied to both the front and rear wheel brake mechanisms, the power of the long stroke single acting piston being applied at greater leverage and with increased power.

Where, as in the construction shown in Fig. 2, two different sets of brake mechanisms are to be simultaneously applied it might happen that one set of brakes would be fully applied before the other, and if the point of pivoting, 51, of the connecting and equalizing lever were a fixed point, it would prevent further application of power to the other brake mechanism. We therefore prefer to support, the lever, 51, on a pivoted hanger, 55, which is pivoted at 56, to the chassis and carries the pivot, 52, at its lower end. It follows from this construction that if the brake mechanism to which the rod, 53, is connected, should be fully applied, slightly before the full application of the brakes connected with the rod, 54, for example, the further application of power by the actuator pistons would slightly shift the pivot, 52, carried by the lower end of the hanger 55, and thus permit the equal application of power to set the brakes connected with the rod, 54. The arc of travel of the swinging bracket, 55, is indicated by a dotted line at 57 in Fig. 2, and it will be understood that where two separate sets of brake mechanisms are simultaneously applied in the manner just described, as soon as either is fully applied, so as to create a sufficient resistance, the further application of power by the actuator pistons will shift the hanger, 55, and the pivot, 52, in whichever direction is necessary to permit the further movement of the rod, 53, or 54, as the case may be, and insure the equal application of the other set of brakes.

With reference to Figs. 1 and 2, when the motor is running and suction is available to produce differentials of pressure on opposite sides of the pistons for the power operations of the pistons, the operator may add his physical force to that of the pistons by fully compressing the spring 22, and transmitting his physical force through the piston rods, 5$^a$, 5, rod 9, and the connecting rod, 53, to the brake mechanisms connected therewith, in this instance the brakes of the rear wheels. None of this physical force of the operator is transmitted to the brakes of the other wheels, in this instance the front or steering wheels, as, should the further movement of the piston, 3, rods, 5, 9 and 53, in the direction of the arrow above rod 9, occur when the physical force of the operator is added to the force previously exerted by the pistons, the portion, 51$^a$, of the lever, 51, will also be moved in the direction of the arrow, while the portion, 51$^b$, of the lever will be moved in the opposite direction. The front brakes being fully applied the point of connection, 51$^y$, with the lever, 51, will offer greater resistance to the movement than the point, 52. Therefore, the point of attachment, 51$^y$, of the front brakes becomes a fulcrum point and the point of connection, 51$^x$, of the rod, 109, with the lever, 51, will move in the direction of the arrow over rod, 109. As the piston, 103, has previously been subjected to the maximum differentials of pressures, a slight movement of this piston in either direction around the pivot point, 51$^y$, will not apply any more or less power to the front wheel brakes.

In the event of failure of power should the operator apply his physical force through the piston, 3, the piston rod, 5, and the rod, 9, to the rear wheel brakes the movement of the end, 51$^a$, of the lever, 51, will be in the direction of the arrow over rod, 9. In this case the release stop customarily employed on brakes of this character would prevent movement of the rod 54 in a direction opposite to the arrow under this rod, and therefore the connection of rod, 54, with lever, 51, at 51$^y$, will constitute a fulcrum point which would result in the movement of the rod, 109, in the direction of the arrow over this rod and a consequent corresponding movement of the piston, 103. Therefore, the physical force of the operator would be applied only to the rear wheel brakes.

Where all of the brakes operated by the actuator are connected at one point with the pivoted connecting and power amplifying lever, it is not necessary that the point of pivoting of said lever should be movable. For example, in Fig. 6, we have shown an arrangement similar in all respects to that illustrated in Figs. 1, 2 and 3, except that the supporting bracket, here indicated at 155, for the connecting and power amplifying lever, 51, pivoted to the said bracket at 52, is a fixed support, secured in any desired way to the chassis. In this figure the lower end of the lever, 51, is pivotally connected by a rod, 53, with brake mechanism, illustrated diagrammatically at 72, and which may be, for example, the brake mechanism for the rear wheel brakes. In this construction, as only one set of brakes is connected with the lever, the power of the main piston having the shorter stroke, and the auxiliary piston having the longer stroke, will be simultaneously applied to the brake mechanism. In both Figs. 2 and 6 we have shown the longer arm of the lever, 51, provided with a plurality of apertures in order that a link rod which is desired to be connected thereto, may be connected at different distances from the pivot, 52, as may be necessary to impart the desired throw to the link rod.

In Fig. 7 we have shown another embodiment of our invention, in which the double acting piston having the shorter stroke and single acting piston having a longer stroke, are located in separate cylinders and operatively combined to produce substantially the same results as are accomplished by the structures illustrated in the other figures. In this figure, 201, represents the cylinder for the double acting piston, which is constructed and operates exactly as does the piston, 3, illustrated in Fig. 4. 205 represents the hollow piston rod of the double acting piston which is connected by a link, 209, in this instance with a power amplifying and connecting lever, 251, which is shown as pivoted at 252, to a stationary support secured to the chassis of the vehicle, the connection of the rod, 209, with the lever, 251, being located at the desired distance from the point of pivoting, 252, so that the intervening portion of the lever constitutes a short arm, 251$^a$. It will be understood that the valve mechanism of the double acting actuator will be, as shown in Fig. 4, and that the valves will be operated by the longitudinally movable hollow sleeves, 220, which is connected with the suction pipe, 262, by a flexible portion, 262$^a$, in the same manner as previously described. The valve sleeve, 220, of the double acting actuator is connected by a link, 226, with the pedal lever, 278, provided with the usual retracting spring, 279, so that the forward movement of the pedal lever in the direction of the arrows, Fig. 7, will admit air in the rear of the double acting piston in the cylinder, 201, and cause it to move in the direction of the arrows, the forward portion of the cylinder, 201, remaining in communication with the suction pipe, as previously described. 301 represents the cylinder for the single acting piston, which is of much greater length than the cylinder, 201, and is provided with a single acting piston, in all respects similar to the piston, 103, shown in Fig. 4, which in this instance will be located in its normal position at the right hand side of the cylinder, 301, in Fig. 7, and will move in the direction of the arrows in that figure, to effect its working stroke. In order to properly guide the single acting piston, it is preferably provided with two piston rods, 305 and 305$^a$, extending through stuffing boxes at opposite ends of the cylinder, but will not be provided with any valve mechanism. A piston rod connected with the single acting piston (in this instance the piston rod, 305) is connected with the lever, 251, at a greater distance from its fulcrum than the connecting rod, 209, from the double acting piston, proportionate to the distance between the strokes of the two pistons, and in such manner that both pistons apply their power in the same direction, that is, in the direction of the arrows in Fig. 7. In this instance the piston rod, 305, is shown connected to the outer end of the lever, 251, but we do not limit ourselves to this particular arrangement of the connecting and power amplifying lever. The ends of the cylinder adjacent to the pistons, in their retracted positions, are connected, as by a pipe, 306, so that the said ends of the cylinder and said connecting pipe constitute the equivalent of the space between the pistons in the form of our invention illustrated, for example, in Fig. 4, and the opposite end of the cylinder, 301, is connected at all times with the source of suction, as the suction pipe, 262, by means of a branch suction pipe, 262$^b$. As the valve mechanism for the double acting piston in the cylinder, 201, is preferably constructed like that illustrated in Fig. 4, and the suction valves thereof are both held normally in open position when the double acting piston is in its retracted or off position, the cylinder, 201, is exhausted on both sides of the piston when the latter is retracted, and it therefore follows that, by reason of the air connections, 306, and 262$^b$, the single acting cylinder, 301, is likewise maintained in a state of rarefication on both sides of the piston when in retracted position, so that in other words, both pistons are submerged in vacuum, as in the form of our invention previously described.

The lever, 251, is connected by means of link rods, 253, with brake mechanism diagrammatically illustrated in Fig. 7, as comprising the brake lever, 272, brake band, 271 and drum.

It will be understood that when the foot lever, 278, is depressed, as before described, and atmospheric air is admitted in rear of the double acting piston and cylinder, 201, it will pass through pipe, 306, to the rear of piston, 303, in the cylinder, 301, with the result that each piston will transmit its power to the brake mechanism at a ratio of leverage corresponding to the difference in the effective stroke of the two pistons. When the valve mechanism is reversed, by releasing the pedal, 278, atmospheric air will be admitted on the forward side of the double acting piston only, while the space in rear thereof will be connected with the suction pipe, 262, through the reversing valve mechanism thus exhausting the air from both cylinders, 201, and 301, in rear of their respective pistons, and enabling the double acting piston in cylinder, 201, to effect a quick release of the brake mechanism and return the single acting piston to normal position, without admitting any atmospheric air to the cylinder, 301, forward of the piston, which at all times remains connected with the suction passage, 262.

In the constructions shown in Figs. 6 and 7, when the motor is running and suction is available to produce differentials of pressures on opposite sides of the piston for the power operations of the pistons, the operator may add his physical strength when the spring, 22, of Fig. 4$^a$, is fully compressed, through the piston rod, 5$^a$, piston, 3, and piston rod, 5, to the brake mechanism of all wheels in addition to the power exerted by the pistons, or to move the pistons and apply the brakes in the event of failure of power, the cylinder being vented through the valve mechanism, the valves being in the open position when the spring, 220, is compressed by the pressure of the foot pedal 78.

The operation of the form of our invention shown in Fig. 7 will be exactly the same as if the two pistons were in the same cylinder and the necessary leverage connections may be made to produce the desired results from the combined force exerted during the power strokes of the two pistons.

Where the double acting piston and single acting piston are located in the same cylinder, as in Figs. 1 to 6, for example, the cylinder may be considered technically as two cylinders, one for each piston, arranged coaxially, and having their inner ends in direct communication, and in the following claims where we have referred to cylinders in which the double acting piston and single acting piston operate, it is to be understood that we mean such cylinders, whether arranged as an integral structure, as in Figs. 1 to 6, for example, or as entirely separate cylinders, as indicated, for example, in Fig. 7. In the construction shown in Figs. 6 and 7, after the operator attempts to apply his physical force to actuate the brakes, either in addition to the power already applied thereto by the differentials of pressure or when no power is present, the actuation of the foot pedal, 78, or 278, will cause an actuation of both pistons through the equalizing levers.

In all embodiments of our invention we prefer to provide means for connecting the operator operated part to the brake mechanism of the vehicle, by means permitting a certain amount of lost motion, sufficient to insure the operation of the controlling valve mechanism. While this may be accomplished in different ways, we have shown one arrangement for this purpose in the drawings, see Figs. 4 and 4a. In this instance the valve actuating sleeve, 20, is provided with a collar, 21, within the hollow piston rod, 5a, of the double acting piston between which, and inwardly projecting portions, 5b, on said piston rod, we provide a spiral spring, 22, so constructed that its coils will be brought into contact when it has been compressed longitudinally to a predetermined extent, so that when so compressed it becomes in effect a sleeve or collar. The spring is so constructed that sufficient lost motion is provided to effect the operation of the valve mechanism.

This arrangement protects the valve mechanism against injury, and also enables the operator to apply his physical force, to the pistons, and brake mechanism, in addition to that of the actuator, and also enables the operator to operate the pistons and brake mechanism by his physical force alone in case of failure of power. It will be understood that in case of failure of power the first portion of the movement of the operator operated part, when actuated, will operate the valve mechanism of the double acting cylinder and will move the valves into such position that the cylinder (or cylinders will be vented) and hence practically no resistance will be encountered beyond the friction of the pistons in the cylinders.

What we claim and desire to secure by Letters Patent is:—

1. A power actuator comprising a double acting piston, a single acting piston, cylinder construction in which said pistons operate, said single acting piston having a longer stroke than that of the double acting piston, means for simultaneously establishing differential pressures on opposite sides of both pistons to effect simultaneous power strokes thereof, including means under the control of an operator operated part for reversing said differential pressures on the opposite faces of the double acting piston and equalizing the pressures on opposite faces of the single acting piston without admitting a higher pressure fluid thereto, means for connecting said pistons at leverages proportionate to their respective strokes, and means for connecting said pistons to a part to be actuated, for imparting the combined force of the power strokes of said pistons thereto, whereby the double acting piston alone will be operative to effect the return stroke of the single acting piston, and the return movement of the part to be operated by said pistons to normal position.

2. A power actuator comprising a double acting piston, a single acting piston, cylinder construction in which said pistons operate, said single acting piston having a longer stroke than that of the double acting piston, means for simultaneously establishing differential pressures on opposite sides of both pistons to effect simultaneous power strokes thereof, including means under the control of an operator operated part for reversing said differential pressures on the opposite faces of the double acting piston and equalizing the pressures on opposite faces of the single acting piston without admitting a higher pressure fluid thereto, connections between said pistons including connected lever arms, the effective lengths of which are proportionate to the respective strokes of said piston, and means for connecting a part to be actuated with said lever arms to impart the force of the combined power strokes of said pistons thereto, whereby the return stroke of the double acting piston alone will be operated to effect the return movement of the single acting piston and the part to be operated, to the normal position.

3. A power actuator comprising a double acting piston, a single acting piston, cylinder construction in which said pistons operate, said single acting piston having a longer stroke than that of the double acting piston, means for simultaneously establishing differential pressures on opposite sides of both pistons to effect simultaneous power strokes thereof, including means under the control of an operator operated part for reversing said differential pressures on the opposite faces of the double acting piston and equalizing the pressures on opposite faces of the single acting piston without admitting a higher pressure fluid thereto, connections between said pistons, including connected pivotally mounted lever arms, the respective lengths of which correspond with the respective power strokes of said pistons, means extending on opposite sides of the pivotal connection of said lever arms for simultaneously operating independent devices, and supporting means for the pivotal support for said lever arms, constructed to permit the movement of said pivotal support in directions substantially in alignment with the connections extending to the parts to be operated, to insure the equal application of the force of the power strokes of both pistons, to the parts to be operated, the return stroke of the double acting piston alone being operative to return the single acting piston and the parts to be operated, to normal position.

4. A power actuator comprising a double acting piston, a single acting piston, cylinder construction in which said pistons operate, said single acting piston having a longer stroke than that of the double acting piston, means for establishing differential pressures on opposite sides of both pistons to effect simultaneous power strokes thereof, including means under the control of an operator operated part for reversing said differential pressures on the opposite faces of the double acting piston and equalizing the pressures on opposite faces of the single acting piston without admitting a higher pressure fluid thereto, connections between said pistons, including connected lever arms mounted on a common pivot, and having their respective effective lengths corresponding with the respective strokes of said pistons, means for connecting said lever arms with independent parts to be operated, including connections extending on opposite sides of said pivot, and a hanger for supporting said pivot, and pivotally connected with a stationary support to permit of the shifting of said pivot to equalize the force of the power strokes of both pistons upon said independent parts to be operated, the return stroke of said double acting piston alone being operative to effect the return of the single acting piston and the parts to be operated, to the normal position.

5. A power actuator comprising a single cylinder closed at each end, a double acting piston normally held at a predetermined distance from one end of the cylinder, a single acting piston in said cylinder located at a greater distance from the other end of the cylinder, and having a longer power stroke, means under the control of an operator operated part for simultaneously establishing differential pressures within the central portion of the cylinder between said pistons and the end portion thereof, to affect a power stroke of each piston in opposite directions, away from each other, including reversing valve mechanism constructed to maintain said piston in a balanced condition when the reversing valve mechanism is in an interjacent position between its limits of movement, said reversing valve mechanism being constructed to reverse the differential pressures with respect to the double acting piston, and permit an equalization of pressures on opposite faces of the single acting piston, connections between said pistons including connected lever arms, the effective lengths of which are proportioned to the respective strokes of said pistons, and means for connecting said lever arms with a part to be operated to transmit the combined force of the power strokes of both pistons thereto, the return stroke of the double acting piston alone being operative to effect the return movement of the single acting piston and the part to be operated, to the normal position.

6. A power actuator comprising a single cylinder closed at each end, a double acting piston normally held at a predetermined distance from one end of the cylinder, a single acting piston in said cylinder located at a greater distance from the other end of the cylinder, and having a longer power stroke, means under the control of an operator operated part for simultaneously establishing differential pressures within the central portion of the cylinder between said pistons and the end portion thereof, to effect a power stroke of each piston in opposite directions, away from each other, including reversing valve mechanism constructed to maintain said piston in a balanced condition when the reversing valve mechanism is in an interjacent position between its limits of movement, said reversing valve mechanism being constructed to reverse the differential pressures with respect to the double acting piston, and permit an equalization of pressures on opposite faces of the single acting piston, connections between said pistons including connected lever arms, extending on opposite sides of their pivotal supports and having their effective lengths proportioned to the respective strokes of said pistons, and means for connecting a part to be operated with said lever arms to simultaneously apply the force of the power strokes of both pistons thereto, the return stroke of the double acting piston being effective to return the single acting piston and the part to be operated, to the normal position.

7. A power actuator comprising a single cylinder closed at each end, a double acting piston normally held at a predetermined distance from one end of the cylinder, a single acting piston in said cylinder located at a greater distance from the other end of the cylinder, and having a longer power stroke, means under the control of an operator operated part for establishing differential pressures within the central portion of the cylinder between said pistons and the end portion thereof, to effect a power stroke of each piston in opposite directions, away from each other, including reversing valve mechanism constructed to maintain said piston in a balanced condition when the reversing valve mechanism is in an interjacent position between its limits of movement, said reversing valve mechanism being constructed to reverse the differential pressures with respect to the double acting piston, and permit an equalization of pressures on opposite faces of the single acting piston, connections between said pistons including connected lever arms, extending on opposite sides of their pivotal supports and having their effective lengths proportioned to the respective strokes of said pistons, means for connecting said lever arms with independent parts to be operated, including connections extending on opposite sides of the pivotal connection of said lever arms, and supporting means for said pivotal connections permitting it to move in opposite directions substantially in alignment with the connections to the parts to be operated, to equalize the application of the power strokes of said pistons on said parts to be operated, the return stroke of the double acting piston alone being operative to return the single acting piston and the parts to be operated, to the normal position.

8. A power actuator comprising a single cylinder closed at each end, a double acting piston normally held at a predetermined distance from one end of the cylinder, a single acting piston in said cylinder located at a greater distance from the other end of the cylinder, and having a longer power stroke, means under the control of an operator operated part for establishing differential pressures within the central portion of the cylinder between said pistons and the end portions thereof, to effect a power stroke of each piston in opposite directions, away from each other, including reversing valve mechanism constructed to maintain said pistons in a balanced condition when the reversing valve mechanism is in an interjacent position between its limits of movement, said reversing valve mechanism being constructed to reverse the differential pressures with respect to the double acting piston, and permit an equalization of pressures on opposite faces of the single acting piston, connections between said pistons including connected lever arms, extending on opposite sides of their pivotal supports and having their effective lengths proportioned to the respective strokes of said pistons, a movable hanger for supporting the pivotal connection of said lever arms, said hanger being pivotally connected to a stationary part and permitting the movement of said pivotal connection in opposite directions, substantially in alignment with the connections to said parts to be operated, to equalize the application of the force of the power strokes of both pistons on said parts to be operated, the return stroke of the double acting piston alone being operative to return the single acting piston and the parts to be operated, to the normal position.

9. A power actuator comprising a double acting piston, a single acting piston, cylinder construction in which said pistons operate said single acting piston having a longer stroke than that of the double acting piston, means for connecting the cylinder for the single acting piston forward of said piston at all times with a source of suction and rear of the piston with the corresponding portion of the double acting piston, reversing valve mechanism for the double acting piston, means for connecting said valve mechanism with said source of suction and with the atmosphere, said valve mechanism being constructed to admit atmospheric air in the rear of both pistons to effect the power strokes thereof and simultaneously to connect the opposite face of the double acting piston with the source of suction, and to reverse said connections with said portions of the double acting cylinder and connected portion of the single acting cylinder, means for connecting said pistons including lever arms, the effective lengths of which are proportioned to the respective lengths of the piston strokes, means for connecting a part to be actuated with said lever arms, and an operator operated part connected with and controlling said reversing valve mechanism, the return stroke of the double acting piston being operative to return the single acting piston and the part to be operated to normal position, without admitting atmospheric air to the cylinder for the single acting piston.

10. A power actuator comprising a cylinder closed at both ends, a double acting piston located therein, and normally being a predetermined distance from one end of the cylinder, a single acting piston in said cylinder normally being at a greater distance from the opposite end of the cylinder, means for connecting the portion of the cylinder on the forward face of the single acting piston with a source of suction at all times, reversing valve mechanism for the double acting piston, means for connecting the valve mechanism with a source of suction and with the atmosphere, said valve mechanism being constructed to connect the space between said pistons with the atmosphere, and the portion of the cylinder on the opposite face of the double acting piston with the source of suction to effect power strokes of both pistons in opposite directions, means for connecting said pistons including connected lever arms, the effective lengths of which are proportioned to the respective lengths of the strokes of said pistons, means for connecting a part to be operated with said lever arms, and an operator operated part connected with said reversing valve mechanism, the return stroke of the double acting piston being operative to return the single acting piston and the part to be operated to the normal position.

11. A power actuator comprising a double acting piston, a single acting piston, cylinder construction in which said pistons operate, said single acting piston having a longer stroke than that of the double acting piston, means for connecting the cylinder for the single acting piston forward of said piston at all times with a source of suction and rear of the piston with the corresponding portion of the double acting cylinder, reversing valve mechanism for the double acting piston, means for connecting said valve mechanism with said source of suction and with the atmosphere, said valve mechanism being constructed to admit atmospheric air in the rear of both pistons to effect the power strokes thereof and simultaneously to connect the opposite face of the double acting piston with the source of suction, and to reverse said connections with said portions of the double acting cylinder and connected portion of the single acting cylinder, means for connecting said pistons, including connected pivot lever arms, the respective lengths of which are proportioned to the length of the respective strokes of said pistons, means for connecting a part to be operated with said lever arms, and an operator operated part connected with said reversing valve mechanism, the return stroke of said double acting piston being operative to return the single acting piston and the part to be operated, to the normal position.

12. A power actuator comprising a cylinder closed at both ends, a double acting piston located therein, and normally being a predetermined distance from one end of the cylinder, a single acting piston in said cylinder normally being at a greater distance from the opposite end of the cylinder, means for connecting the portion of the cylinder on the forward face of the single acting piston with the source of suction at all times, reversing valve mechanism for the double acting piston, means for connecting the valve mechanism with a source of suction and with the atmosphere, said valve mechanism being constructed to connect the space between said pistons with the atmosphere, and the portion of the cylinder on the opposite face of the double acting piston with the source of suction to effect power strokes of both pistons in opposite directions, means for holding said reversing valve mechanism in position to connect the space between said pistons and the space on the opposite side of the double acting piston with the source of suction when said pistons are in retracted position, whereby said pistons are maintained submerged in vacuum when in retracted position, means for connecting said pistons, including connected pivoted lever arms, the effective lengths of which vary proportionately to the difference of the strokes of said pistons, means for connecting a part to be operated with said lever arms, and an operator operated part connected with said reversing valve mechanism, the return stroke of the double acting piston being operative to effect the return movement of the single acting piston and the part to be operated, to the normal position.

13. A power actuator comprising a cylinder closed at both ends, a double acting piston located therein, and normally being a predetermined distance from one end of the cylinder, a single acting piston in said cylinder normally being at a greater distance from the opposite end of the cylinder, means connecting the portion of the cylinder on the forward face of the single acting piston with the source of suction at all times, reversing valve mechanism for the double acting piston, means for connecting the valve mechanism with a source of suction and with the atmosphere, said valve mechanism being constructed to connect the space between said pistons with the atmosphere, and the portion of the cylinder on the opposite face of the double acting piston with the source of suction to effect power strokes of both pistons in opposite directions, a hollow piston rod connected with the single acting piston, and extending through the adjacent end of the cylinder, a piston rod connected with the double acting piston and extending through said hollow piston rod of the single acting piston and through the same end of the cylinder, connections between said piston rods including connected lever arms extending in opposite directions from their pivotal axis, and link rods connecting each piston rod with one of said arms, said lever arms having their effective lengths proportioned to the respective lengths of the strokes of said pistons, means for connecting a part to be operated with said lever arms, and an operator operated part connected with said reversing valve mechanism, the return stroke of the double acting piston being operative to effect the return movement of the single acting piston and the part to be operated, to the normal position.

14. A power actuator comprising a cylinder closed at both ends, a double acting piston located therein, and normally being a predetermined distance from one end of the cylinder, a single acting piston in said cylinder normally being at a greater distance from the opposite end of the cylinder, means for connecting the portion of the cylinder on the forward face of the single acting piston with the source of suction at all times, reversing valve mechanism for the double acting piston, means for connecting the valve mechanism with a source of suction and with the atmosphere, said valve mechanism being constructed to connect the space between said pistons with the atmosphere, and the portion of the cylinder on the opposite face of the double acting piston with the source of suction to effect power strokes of both pistons in opposite directions, a hollow piston rod connected with the single acting piston, and extending through the adjacent end of the cylinder, a piston rod connected with the double acting piston and extending through said hollow piston rod of the single acting piston and through the same end of the cylinder, connections between said piston rods including connected lever arms extending in opposite directions from their pivotal axis, and link rods connecting each piston rod with one end of said arms, said lever arms having their effective lengths proportioned to the respective lengths of the strokes of said pistons, means for connecting independent parts to be operated with each of said lever arms, a pivoted hanger supporting the pivotal connection from said lever arms, and constructed to permit movement thereof in directions to equalize the force of the power strokes of said pistons on said parts to be operated, and an operator operated part connected with said reversing valve mechanism, the return stroke of the double acting piston being operative to effect the return movement of the single acting piston and the parts to be operated, to the normal position.

15. In an automotive vehicle, provided with an internal combustion engine for propelling the same, provided with a suction passage for explosive mixture, and brake mechanism for the vehicle, of power actuating mechanism for the brake mechanism, comprising a double acting piston, a single acting piston having a longer stroke than the double acting piston, cylinder portions for said pistons, means for connecting the single acting piston forward of said piston at all times with a source of suction and rear of the piston with the corresponding portion of the double acting piston, reversing valve mechanism for the double acting piston, means for connecting said valve mechanism with said source of suction and with the atmosphere, said valve mechanism being constructed to admit atmospheric air in the rear of both pistons to effect the power strokes thereof and simultaneously to connect the opposite face of the double acting piston with the source of suction, and to reverse said connections with said portions of the double acting cylinder and connected portion of the single acting cylinder, means for connecting said pistons, including connected pivoted lever arms, the effective lengths of which are proportioned to the strokes of said pistons respectively, connections between said lever arms and the brake mechanism of the vehicle, and an operator operated device for controlling said valve mechanism, the return stroke of the double acting piston being operative to positively effect the return movement of the single acting piston and brake mechanism, to the normal position.

16. In an automotive vehicle, provided with an internal-combustion engine for propelling the same, provided with a suction passage for explosive mixture, and brake mechanism for the vehicle, of power actuating mechanism for the brake mechanism, comprising a double acting piston, a single acting piston having a longer stroke than the double acting piston, cylinder portions for said pistons, means for connecting the single acting piston forward of said piston at all times with a source of suction and rear of the piston with the corresponding portion of the double acting piston, reversing valve mechanism for the double acting piston, means for connecting said valve mechanism with said source of suction and with the atmosphere, said valve mechanism being constructed to admit atmospheric air in the rear of both pistons to effect the power strokes thereof and simultaneously to connect the opposite face of the double acting piston with the source of suction, and to reverse said connections with said portions of the double acting cylinder and connected portions of the single acting cylinder, without admitting air forward of the single acting piston, means for connecting said pistons, including connected pivoted lever arms, the effective lengths of which are proportioned to the strokes of said pistons respectively, connections between said lever arms and the brake mechanism of the vehicle, an operator operated device for controlling said valve mechanism, the return stroke of the double acting piston being operative to positively effect the return movement of the single acting piston and brake mechanism, to the normal position, and means for holding said reversing valve mechanism in position to connect the cylinder portions in rear of both pistons and the cylinder portion on the opposite face of the double acting piston with the suction passage of the engine when said pistons are in retracted position.

17. A power actuator for automotive brake mechanisms comprising a cylinder closed at both ends, a double acting piston located therein, and normally being a predetermined distance from one end of the cylinder, a single acting piston in said cylinder normally being at a greater distance from the opposite end of the cylinder, means for connecting the portion of the cylinder on the forward face of the single acting piston with the source of suction at all times, reversing valve mechanism for the double acting piston, means for connecting the valve mechanism with a source of suction and with the atmosphere, said valve mechanism being constructed to connect the space between said pistons with the atmosphere, and the portion of the cylinder on the opposite face of the double acting piston with the source of suction to effect power strokes of both pistons in opposite directions, a hollow piston rod connected with the single acting piston, and extending through the adjacent end of the cylinder, a piston rod connected with the double acting piston and extending through said hollow piston rod of the single acting piston and through the same end of the cylinder, connections between said piston rods including connected lever arms extending in opposite directions from their pivotal axis, and link rods connecting each piston rod with one of said arms, said lever arms having their effective lengths proportioned to the respective lengths of the strokes of said pistons, separate connections from said lever arms on opposite sides of the pivotal connections thereof, to different brake mechanisms of the vehicle, and a pivotally supported hanger for the pivotal connections of said lever arms, constructed to permit the movement of said pivotal support in directions substantially in alignment with said connections, to equalize the force of the power strokes of said pistons between said brake mechanism.

18. In an automotive vehicle, provided with an internal combustion engine for propelling the same, provided with a suction passage for explosive mixture, and brake mechanism for the vehicle, of power actuating mechanism for the brake mechanism, comprising a single cylinder closed at both ends, a double acting piston, and a single acting piston having a longer stroke than the double acting piston in said cylinder, means for connecting the portion of the cylinder forward of the single acting piston at all times with the suction passage of the engine, reversing valve mechanism for the double acting piston, means for connecting said valve mechanism with said suction passage and with the atmosphere, said valve mechanism being constructed to admit atmospheric air between said pistons to effect the power strokes thereof, and simultaneously connect the portion of the cylinder forward of the double acting piston with the suction passage and to reverse said connections without admitting atmospheric air to the portion of the cylinder forward of the single acting piston, means for connecting said pistons for joint operation including connected pivoted lever arms, the effective lengths of which are proportioned to the strokes of the said pistons respectively, connections between said lever arms and the brake mechanism of the vehicle, and an operator operated device for controlling said valve mechanism, the return stroke of the double acting piston being operative to effect the return movement of the single acting piston and brake mechanism to normal position.

19. In an automotive vehicle, provided with an internal combustion engine for propelling the same, provided with a suction passage for explosive mixture, and brake mechanism for the vehicle, of power actuating mechanism for the brake mechanism, comprising a single cylinder closed at both ends, a double acting piston, and a single acting piston having a longer stroke than the double acting piston in said cylinder, means for connecting the portion of the cylinder forward of the single acting piston at all times with the suction passage of the engine, reversing valve mechanism for the double acting piston, means for connecting said valve mechanism with said suction passage and with the atmosphere, said valve mechanism being constructed to admit atmospheric air between said pistons to effect the power strokes thereof, and simultaneously connect the portion of the cylinder forward of the double acting piston with the suction passage and to reverse said connections without admitting atmospheric air to the portion of the cylinder forward of the single acting piston, means for connecting said pistons for joint operation including connected pivoted lever arms, the effective lengths of which are proportioned to the strokes of the said pistons respectively, connections between said lever arms and the brake mechanism of the vehicle, an operator operated device for controlling said valve mechanism, the return stroke of the double acting piston being operative to effect the return movement of the single acting piston and brake mechanism to normal position, and means for holding said reversing valve mechanism in position to connect the cylinder between said pistons and the portion of the cylinder forward of the double acting piston with the suction passage of the engine when the pistons are in retracted position.

20. A power actuator comprising two cylinder portions, and a piston in each, one of said pistons having a longer stroke than the other, means for simultaneously establishing differential pressures on opposite faces of said pistons to produce simultaneous power strokes thereof, including controlling valve mechanism, means for connecting said pistons with a part to be operated thereby by leverages proportioned to the lengths of their respective strokes, one of said pistons being single acting and the other being double acting, the return stroke of the double acting piston being operative to effect the return stroke of the single acting piston and the part operated by said pistons to normal position.

21. A power actuator comprising two cylinder portions, and a piston in each, one of said pistons having a longer stroke than the other, means for simultaneously establishing differential pressures on opposite faces of said pistons to produce simultaneous power strokes thereof, including controlling valve mechanism, means for connecting said pistons with a part to be operated thereby by leverages proportioned to the lengths of their respective strokes, one of said pistons being single acting and the other being double acting, the return stroke of the double acting piston being operative to effect the return stroke of the single acting piston and the part operated by said pistons to normal position, said valve mechanism being constructed to admit higher pressure fluid in rear of both pistons to effect said simultaneous power strokes, and to admit higher pressure fluid on the opposite face of the double acting piston only to effect the return movements of said pistons.

22. A power actuator comprising a single cylinder closed at its ends, two pistons in said cylinder movable simultaneously in opposite directions, means for simultaneously establishing differential pressures in the space between said pistons and the spaces at opposite ends of the cylinder to effect simultaneous power strokes of both pistons, including controlling valve mechanism, one of said pistons having a longer stroke than the other, means for connecting said pistons with a part to be operated by leverages proportioned to the lengths of their respective strokes, one of said pistons being single acting and the other being double acting the return stroke of the double acting piston being operative to return the single acting piston and the part operated by said pistons to normal positions.

23. A power actuator comprising two cylinder portions, and a piston in each, one of said pistons having a longer stroke than the other, means for simultaneously establishing differential pressures on opposite faces of said pistons to produce simultaneous power strokes thereof, including controlling valve mechanism, means for connecting said pistons with a part to be operated thereby by leverages proportioned to the lengths of their respective strokes, an operator operated part, connected with said valve mechanism, and operatively connected with one of said pistons by means permitting sufficient lost motion to effect the operation of the valve mechanism, whereby the operator may add his physical force to that of said pistons and may operate the part operated thereby by his physical force alone in case of failure of power.

24. A power actuator comprising two cylinder portions, and a piston in each, one of said pistons having a longer stroke than the other, means for establishing differential pressures on opposite faces of said pistons to produce simultaneous power strokes thereof, including controlling valve mechanism, means for connecting said pistons with a part to be operated thereby by leverages proportioned to the lengths of their respective strokes, one of said pistons being single acting and the other being double acting, the return stroke of the double acting piston being operative to effect the return stroke of the single acting piston and the part operated by said pistons to normal position, said valve mechanism being constructed to admit higher pressure fluid in rear of both pistons to effect said simultaneous power strokes, and to admit higher pressure fluid on the opposite face of the double acting piston only to effect the return movements of said pistons, an operator operated part, connected with said valve mechanism, and operatively connected with the double acting piston by means permitting sufficient lost motion to effect the operation of the valve mechanism, whereby the operator may add his physical force to that of said pistons and may operate the part to be operated thereby by his physical force alone in case of failure of power.

25. A power actuator comprising a double acting piston, a single acting piston, cylinder construction in which said pistons operate, said single acting piston having a longer stroke than that of the double acting piston, means for establishing differential pressures on opposite sides of both pistons to effect simultaneous power strokes thereof, including means for reversing said differential pressures on the opposite faces of the double acting piston and equalizing the pressures on opposite faces of the single acting piston without admitting a higher pressure fluid thereto, means for connecting said pistons at leverages proportionate to their respective strokes, means for connecting said pistons to a part to be actuated, for imparting the combined force of the power strokes of said pistons thereto, whereby the double acting piston alone will be operative to effect the return stroke of the single acting piston, and the return movement of the part to be operated by said pistons to normal position, an operator operated part, connected with said valve mechanism, and operatively connected with the double acting piston by means permitting sufficient lost motion to effect the operation of the valve mechanism, whereby the operator may add his physical force to that of said pistons and may operate the part to be operated thereby by his physical force alone in case of failure of power.

26. In an automotive vehicle, provided with an internal combustion engine for propelling the same, provided with a suction passage for explosive mixture and brake mechanism for the vehicle, of power actuating mechanism for the brake mechanism, comprising a double acting piston, a single acting piston having a longer stroke than the double acting piston, cylinder portions for said pistons, means for connecting the single acting piston forward of said piston at all times with a source of suction and rear of the piston with the corresponding portion of the double acting piston, reversing valve mechanism for the double acting piston, means for connecting said valve mechanism with said source of suction and with the atmosphere, said valve mechanism being constructed to admit atmospheric air in the rear of both pistons to effect the power strokes thereof and simultaneously to connect the opposite face of the double acting piston with a source of suction, and to reverse said connections with said portions of the double acting cylinder and connected portion of the single acting cylinder, means for connecting said pistons, including connected pivoted lever arms, the effective lengths of which are proportioned to the strokes of said pistons respectively, connections between said lever arms and the brake mechanism of the vehicle, and an operator operated device for controlling said valve mechanisms, the return stroke of the double acting piston being operative to positively effect the return movement of the single acting piston and brake mechanism, to the normal position, said operator operated part being connected with the piston of the double acting actuator by means permitting lost motion, whereby the operator may add his physical force to that of the actuator pistons in applying the brake mechanism, and may operate brake mechanism by physical force in case of failure of power.

27. A power actuator comprising two cylinder portions, and a piston in each, means for establishing differential pressures on opposite faces of said pistons to produce simultaneous power strokes thereof, including controlling valve mechanism, means for connecting said pistons with a plurality of parts to be operated thereby, and an operator operated part for the valve mechanism controlling both pistons, which is connected with less than all of said parts through the valve mechanism.

28. In an automotive vehicle having steering and non-steering wheels and brake mechanism for both sets of wheels, of a power actuator comprising two cylinder portions, a piston in each portion, means for establishing differential pressures on opposite faces of said pistons to produce simultaneous power strokes thereof, including controlling valve mechanism, means for connecting said pistons with said brake mechanisms to be operated thereby by leverages proportional to the length of their respective strokes, and an operator operated part connected through the valve mechanism with the brake mechanism of the non-steering wheels.

29. In a brake system for automotive vehicles, the combination with a fluid pressure operated actuating means provided with a single acting piston and a double acting piston, a single controlling valve mechanism, and an operator operated part connected therewith, the single acting piston having a longer stroke than that of the double acting piston, of a pivotally supported equalizing lever having connected arms extending on opposite sides of its pivotal support, and having their effective lengths proportioned to the respective strokes of said pistons, means for connecting each of said arms with one of said pistons, and connections from said equalizing lever with brake mechanism of the vehicle.

30. In a brake system for automotive vehicles, the combination with a fluid pressure operated actuating means provided with a single acting piston and a double acting piston, a single controlling valve mechanism, and an operator operated part connected therewith, the single acting piston having a longer stroke than that of the double acting piston, of a pivotally supported equalizing lever having connected arms extending on opposite sides of its pivotal support, and having their effective lengths proportioned to the respective strokes of said pistons, means for connecting each of said arms with one of said pistons, connections from said equalizing lever on opposite sides of its point of pivoting respectively to independently operable brake mechanisms.

31. In a brake system for automotive vehicles, the combination with a fluid pressure operated actuating means provided with a single acting piston and a double acting piston, a single controlling valve mechanism, and an operator operated part connected therewith, the single acting piston having a longer stroke than that of the double acting piston, of a pivotally supported equalizing lever having connected arms extending on opposite sides of its pivotal support, and having their effective lengths proportioned to the respective strokes of said pistons, means for connecting each of said arms with one of said pistons, connections from said equalizing lever on opposite sides of its point of pivoting respectively to independently operable brake mechanisms, and a supporting member for said equalizing lever, pivotally connected therewith and movable in the directions of movement of said connections.

32. In a brake system for automotive vehicles, the combination with a fluid pressure operated actuating means provided with a single acting piston and a double acting piston, a single controlling valve mechanism, and an operator operated part connected therewith, the single acting piston having a longer stroke than that of the double acting piston, of a pivotally supported equalizing lever having connected arms extending on opposite sides of its pivotal support, and having their effective lengths proportioned to the respective strokes of said pistons, means for connecting each of said arms with one of said pistons, connections from said equalizing lever on opposite sides of its point of pivoting respectively to independently operable brake mechanisms, and a pivotally mounted hanger for supporting said equalizing lever pivotally connected therewith.

33. In a brake system for automotive vehicles, the combination with a fluid pressure operated power actuating means, provided with a single acting piston and a double acting piston, a single controlling valve mechanism, and an operator operated part connected therewith, the single acting piston having a longer stroke than that of the double acting piston, a pivoted lever provided with arms extending on opposite sides of its point of pivoting, means for connecting each of said arms with one of said pistons, said arms having their effective lengths proportioned to the respective strokes of said pistons, connections from said lever to brake mechanism of the vehicle, and means including a provision for lost motion for connecting said operator operated part with one of said pistons.

34. In a brake system for automotive vehicles, the combination with a fluid pressure operated power actuating means, provided with a single acting piston and a double acting piston, a single controlling valve mechanism, and an operator operated part connected therewith, the single acting piston having a longer stroke than that of the double acting piston, a pivoted lever provided with arms extending on opposite sides of its point of pivoting, means for connecting each of said arms with one of said pistons, said arms having their effective lengths proportioned to the respective strokes of said pistons, connections from said lever to brake mechanism of the vehicle, and means including a provision for lost motion for connecting said operator operated part with said double acting piston.

In testimony whereof we affix our signatures.

CALEB S. BRAGG.
VICTOR W. KLIESRATH.